United States Patent

Bischoff et al.

[11] Patent Number: 6,089,018
[45] Date of Patent: Jul. 18, 2000

[54] METHOD OF CONTROLLING A VTG EXHAUST GAS TURBOCHARGER

[75] Inventors: Roland Bischoff, Plüderhausen; Hermann Hiereth, Esslingen, both of Germany

[73] Assignee: Daimler-Benz Aktiengesellschaft, Stuttgart, Germany

[21] Appl. No.: 09/192,053

[22] Filed: Nov. 13, 1998

[30] Foreign Application Priority Data

Nov. 14, 1997 [DE] Germany ............................ 197 50 445

[51] Int. Cl.$^7$ ...................................................... F02D 23/00
[52] U.S. Cl. ............................................................ 60/602
[58] Field of Search .................................... 60/602, 605.1

[56] References Cited

U.S. PATENT DOCUMENTS 5,228,368  7/1993  Kato et al. ................................. 60/602

FOREIGN PATENT DOCUMENTS 40 14 398 A1  11/1991  Germany .
195 31 871  C1  11/1996  Germany .
195 43 190  A1  5/1997  Germany .

*Primary Examiner*—Noah P. Kamen
*Attorney, Agent, or Firm*—Kenyon & Kenyon

[57] ABSTRACT

A method for controlling a variable turbine geometry of an exhaust gas turbocharger which supercharges an internal combustion engine for driving a motor vehicle. The turbine geometry is set as a function of the operating load of the internal combustion engine between the opening position in idling and the closed position in full load operation. The turbine geometry is brought into an operating position predetermined for the prevailing load point. To improve the non-steady-state operating performance of the exhaust gas turbocharger and the internal combustion engine, in particular during long acceleration phases of the motor vehicle, the turbine geometry is guided during a switching pause for changing gear levels of the motor vehicle into a switching pause position which is independent of the operating load. In the switching pause position a reduced flow cross section of the turbine for the exhaust gas stream is set. This prevents a drop in supercharger rotation speed during the switching pause and the related delay in buildup of the torque and boost pressure of the internal combustion engine.

7 Claims, 3 Drawing Sheets

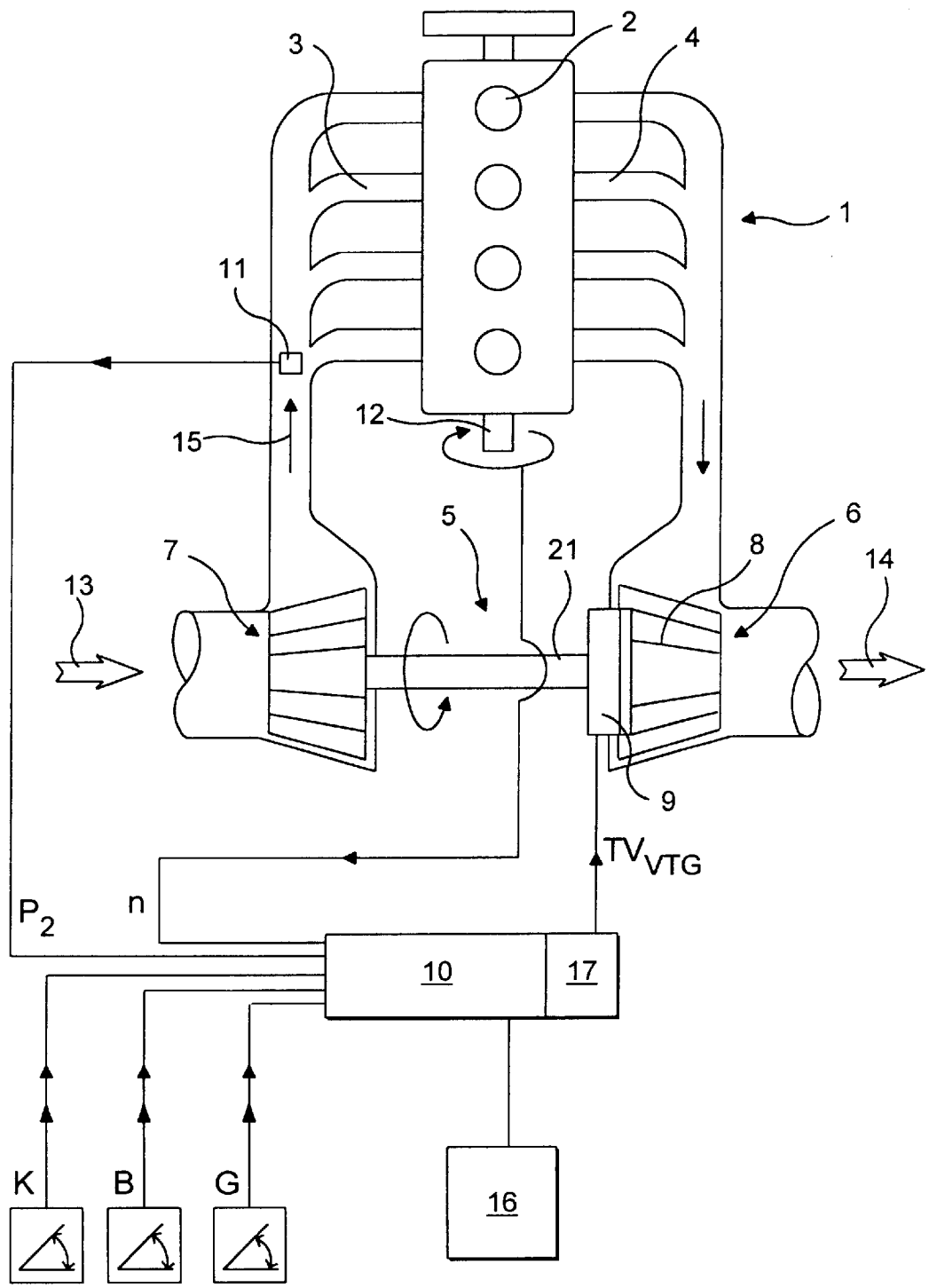
F I G. 1

METHOD OF CONTROLLING A VTG EXHAUST GAS TURBOCHARGER

FIELD OF THE INVENTION

The present invention relates to a method of controlling a variable turbine geometry (VTG) of an exhaust gas turbocharger which supercharges an internal combustion engine to drive a motor vehicle.

RELATED TECHNOLOGY

The power output by an internal combustion engine is proportional to the air flow rate and the density of the combustion air supplied. Therefore the power can be increased by supercharging, i.e., by precompression of the combustion air before it enters the internal combustion engine, in comparison with an internal combustion engine with the same combustion chamber volume and the same rotation speed but without supercharging. Supercharging can be accomplished by an exhaust gas turbocharger. An exhaust gas turbocharger is essentially two turbo-engines—a turbine driven by the exhaust gas stream from the internal combustion engine, and a compressor driven by the turbine which precompresses a stream of fresh air for the internal combustion engine according to its rotation speed. The turbine and the compressor are connected by a supercharger shaft and they rotate in synchronization. The boost pressure downstream from the compressor and the exhaust gas pressure upstream from the turbine are linked together due to the equilibrium of moments on the supercharger shaft, with the exhaust gas stream being dammed up upstream from the turbine due to the boost pressure acting on the compressor. The backpressure of the exhaust gas stream is converted into boost pressure of the boost air stream conveyed to the internal combustion engine in accordance with a boost ratio defined by the prevailing flow cross sections of the turbine and the compressor.

The demand for charging air increases with an increase in power of the internal combustion engine, so that a higher boost pressure must be generated accordingly. The flow cross section of the turbine and thus the backpressure energy to be transferred from the exhaust gas turbocharger to the boost air stream can be varied by a variable turbine geometry via, for example, an adjustable guide grating of the turbine. The turbine geometry is adjusted as a function of the operating load of the internal combustion engine and can assume any desired position between the opening position in idling with the maximum flow cross section, and the closed position with a minimum flow cross section. In each steady state of operation of the internal combustion engine, the turbine geometry is converted into an operating position with a specific flow cross section which is predefined for the respective prevailing load point and yields a boost air flow rate with minimal fuel consumption by the internal combustion engine. The flow cross section is reduced with an increase in engine power so that the boost air, and thus the boost air flow rate to the internal combustion engine, is adapted to the prevailing steady state of operation with a suitably increased compressor power.

Controlling the variable turbine geometry permits optimal adaptation of the exhaust gas turbocharger and its supercharging performance to the internal combustion engine over the entire load characteristics map. Load point-individual adaptation of the boost pressure is effected with advantageous air ratios in forming the mixture in the internal combustion engine and with low charge changing work.

However, the known methods of controlling the variable turbine geometry have disadvantages in non-steady-state operation of the VTG exhaust gas turbocharger and the supercharged internal combustion engine. The required torque of the internal combustion engine is built up too slowly, especially during lengthy acceleration phases of a vehicle driven by the internal combustion engine. Furthermore, the internal combustion engine has an inadequate exhaust output performance.

SUMMARY OF THE INVENTION

An object of the present invention is to provide a method for controlling a variable turbine geometry for improved non-steady-state operating performance of the exhaust gas turbocharger and the internal combustion engine, especially during long acceleration phases of the vehicle driven by the internal combustion engine.

The present invention provides a method of controlling a variable turbine geometry of an exhaust gas turbocharger (5) which supercharges an internal combustion engine (1) to drive a motor vehicle, with the turbine geometry being set as a function of the operating load of the internal combustion engine (1) between the opening position in idling, where a maximum flow cross section on the turbine (6) of the exhaust gas turbocharger (5) is set, and the closed position in full load operation of the internal combustion engine (1) and brought into an operating position predetermined for the prevailing load point. During a switching pause in load operation of the internal combustion engine to change gear levels of a motor vehicle, the turbine geometry is guided into a switching pause position which is independent of the operating load, where a reduced flow cross section of the turbine (6) is set.

The slow buildup of boost pressure and torque of the internal combustion engine as the vehicle accelerates to a significantly higher final velocity can be attributed to the drop in supercharger rotation speed in no-load operation of the internal combustion engine during switching pauses for changing the transmission levels of the vehicle transmission. The cause of the sudden drop in rotation speed during the switching pauses is the conversion of the variable turbine geometry to the opening position assigned to steady-state idling of the internal combustion engine. This disadvantageously occurs with known control methods even in no-load switching pause operation during non-steady-state operation of the internal combustion engine. According to the present invention, during a switching pause the turbine geometry is converted independently of the operating load to a predetermined switching pause position in which a reduced flow cross section of the turbine is set. This counteracts the drop in supercharger rotation speed. In the switching pause position of the variable turbine geometry, the exhaust gas stream of the internal combustion engine drives the exhaust gas turbocharger with a rotation speed corresponding to the reduced flow cross section of the turbine. The flow cross section of the turbine in the switching pause position is predetermined in such a way that the supercharger rotation speed associated with the switching pause setting promotes acceleration of the exhaust gas turbocharger out of the switching pause state at the full-load operational condition of the following gear level.

BRIEF DESCRIPTION OF THE DRAWINGS

The present invention is explained in greater detail below with reference to the drawings, in which:

FIG. 1 shows a schematic diagram of an internal combustion engine supercharged by a VTG exhaust gas turbocharger;

DETAILED DESCRIPTION

Figure 2:
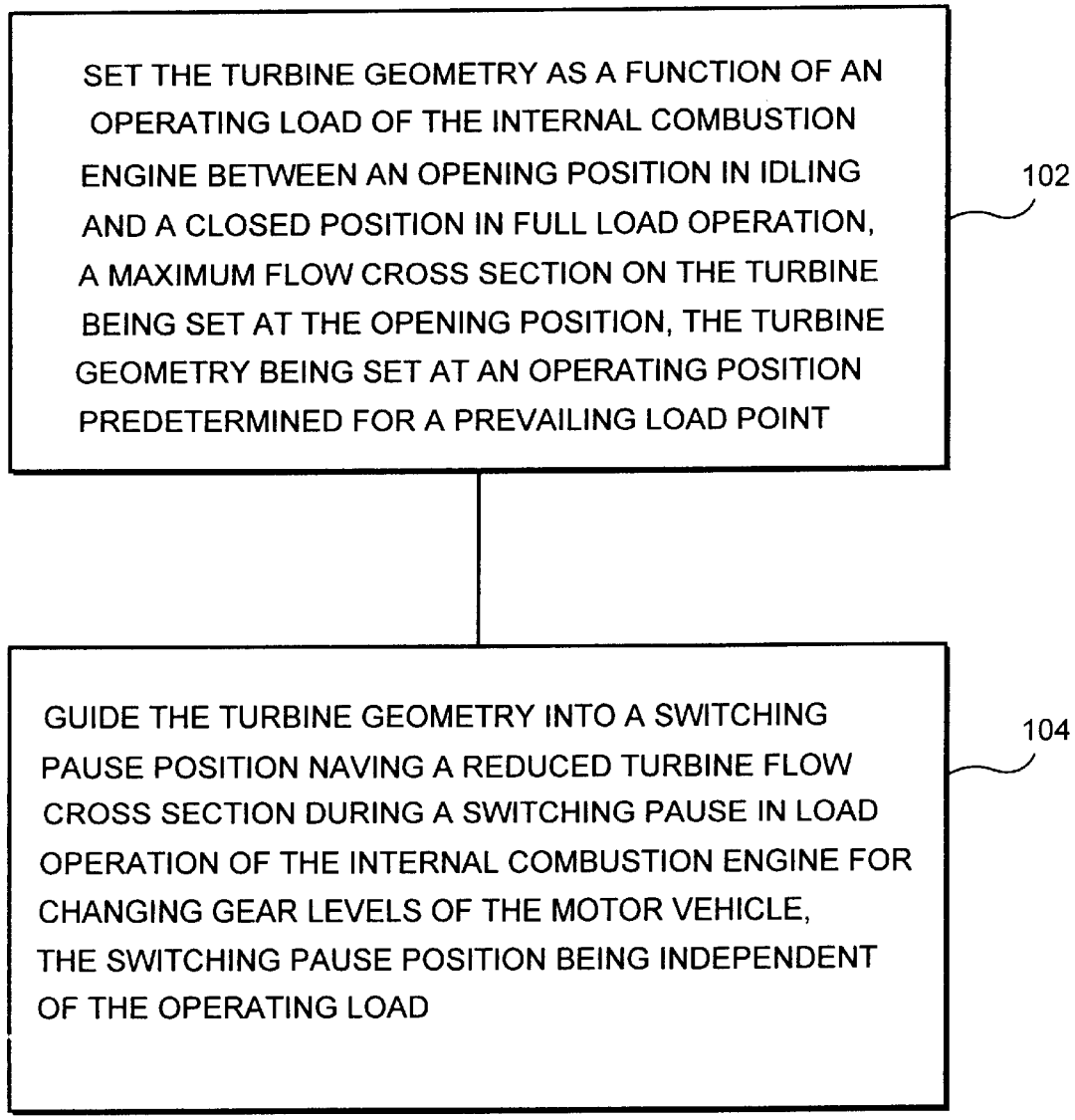
FIG. 2 shows a block diagram of a method according to the present invention.

FIG. 1 shows an internal combustion engine 1, which drives a motor vehicle (not shown here), with a multiple-gear vehicle transmission and a drive train clutch being provided in the drive train of the motor vehicle Internal combustion engine 1 is supercharged by an exhaust gas turbocharger 5. A compressor 7 of exhaust gas turbocharger 5 is arranged in intake system 3 of the internal combustion engine and generates compressed boost air 15 from fresh air 13, the compressed boost air being supplied in the intake system 3 to the inlet into cylinders 2 of internal combustion engine 1. Compressor 7 is connected by a supercharger shaft 21 to a turbine 6 which is arranged in exhaust system 4 of internal combustion engine 1. Turbine 6 receives exhaust gas stream 14 and rotatably drives compressor 7. The flow energy of exhaust gas stream 14 is transferred to fresh air stream 13 drawn in by compressor 7 in accordance with the ratio of the respective flow cross sections of turbine 6 and compressor 7. The ratio of the respective flow cross sections, and thus the ratio between the exhaust gas backpressure upstream from turbine 6 and the boost pressure downstream from compressor 7, can be influenced by a variable turbine geometry so that the pressure boosting ratio can be adapted over the entire characteristics map of the internal combustion engine. An actuator 9 acts on an adjustable guide grating 8—e.g., an adjustable vane ring—of turbine 6.

Referring additionally to FIG. 2, the turbine geometry is adjustable as a function of the operating load of internal combustion engine 1 between an opening position in idling, with a maximum flow cross section being set in exhaust gas stream 14 to receive the exhaust gas stream, and a closed position in full-load operation of the internal combustion engine, as shown in block 102. Each steady-state load point of the internal combustion engine is assigned a certain flow cross section of turbine 6, the flow cross section being reduced with an increasing operating load, so that the rotation speed of exhaust gas turbocharger 5—and thus the compressor output—are increased with an increase in exhaust gas back-pressure upstream from turbine 6. A pulse duty factor $TV_{VTG}$, which is generated as a current output signal by a control/regulator unit 10, is supplied to actuator 9. Control/regulator unit 10 determines the required load point from suitable input quantities and causes the variable turbine geometry to be brought into the predefined operating position for the prevailing load point. The operating positions of guide grating 8 assigned to given steady-state load levels, and thus the flow cross sections of turbine 6, are stored electronically in a characteristics map 16 and can be retrieved as needed by control/regulator unit 10. The load state of the internal combustion engine is determined in an essentially known manner from suitable engine parameters, such as, for example, a position angle-dependent operating signal G of a gas pedal, supplied by an operations management system of internal combustion engine 1.

The operating position of turbine guide grating 8 is regulated in the present embodiment through control unit 10 reading out of characteristics map 16 a setpoint for conducting a setpoint/actual value comparison with the determined control quantity. In this embodiment, the control quantity is the boost pressure $P_2$ downstream of compressor 7, which is measured continuously by a pressure sensor 11 in intake system 3 of internal combustion engine 1. However, the control quantity may also be to advantage the pressure gradient between the boost pressure in intake system 3 and exhaust gas back-pressure in exhaust system 4. This pressure gradient influences the gas changing work of internal combustion engine 1.

VTG exhaust gas turbocharger 5 can also work in engine braking operation, where the position of the turbine geometry increases the gas changing work of the internal combustion engine and ensures deceleration. The settings of turbine guide grating 8, determined in advance for engine braking operation, are also stored in characteristics map 16 where they are available as needed. Engine braking operation is indicated to control unit 10 through supply to the unit of appropriate input signals, such as, for example, operating signal B of a brake pedal.

In acceleration of the vehicle to a high final speed, the turbine geometry in the individual gear levels is kept close to the closed position provided for full load operation of the internal combustion engine. In the switching pauses for changing the gear levels, the turbine geometry is guided into a switching pause position which is predetermined independently of the operating load. (See block 104 of FIG. 2) In the switching pause position, a reduced flow cross section of turbine 6 is set to receive exhaust gas stream 14, so the exhaust gas turbocharger is kept at a high rotation speed, and the required compressor power is available after the short switching time for carrying out the gear changing operation. This prevents slow acceleration of the exhaust gas turbocharger out of the turbine geometry opening position, and a similarly slow, or gradual—as from idling—buildup of the internal combustion engine torque.

An advantageous position of turbine guide grating 8 can be set as the switching pause setting. This position is assumed with each switching pause. The switching pause position can be determined to advantage from a predefined characteristic curve as a function of an operating speed in internal combustion engine 1 when changing gear levels of the motor vehicle. The switching characteristic curve is stored in characteristics map 16. The respective operating speed n for readout of the switching pause characteristic curve is determined from a measurement of rotation speed on crankshaft 12. The switching pause position of turbine guide grating 8 can be regulated to particular advantage at a predetermined guide quantity. The pressure gradient between intake system 3 and exhaust system 4 of internal combustion engine 1 is determined to advantage as the control quantity. The same engine parameter which forms the control quantity for the position of the variable turbine geometry in load operation can be used to advantage as the control quantity for the switching pause position.

Figure 3:
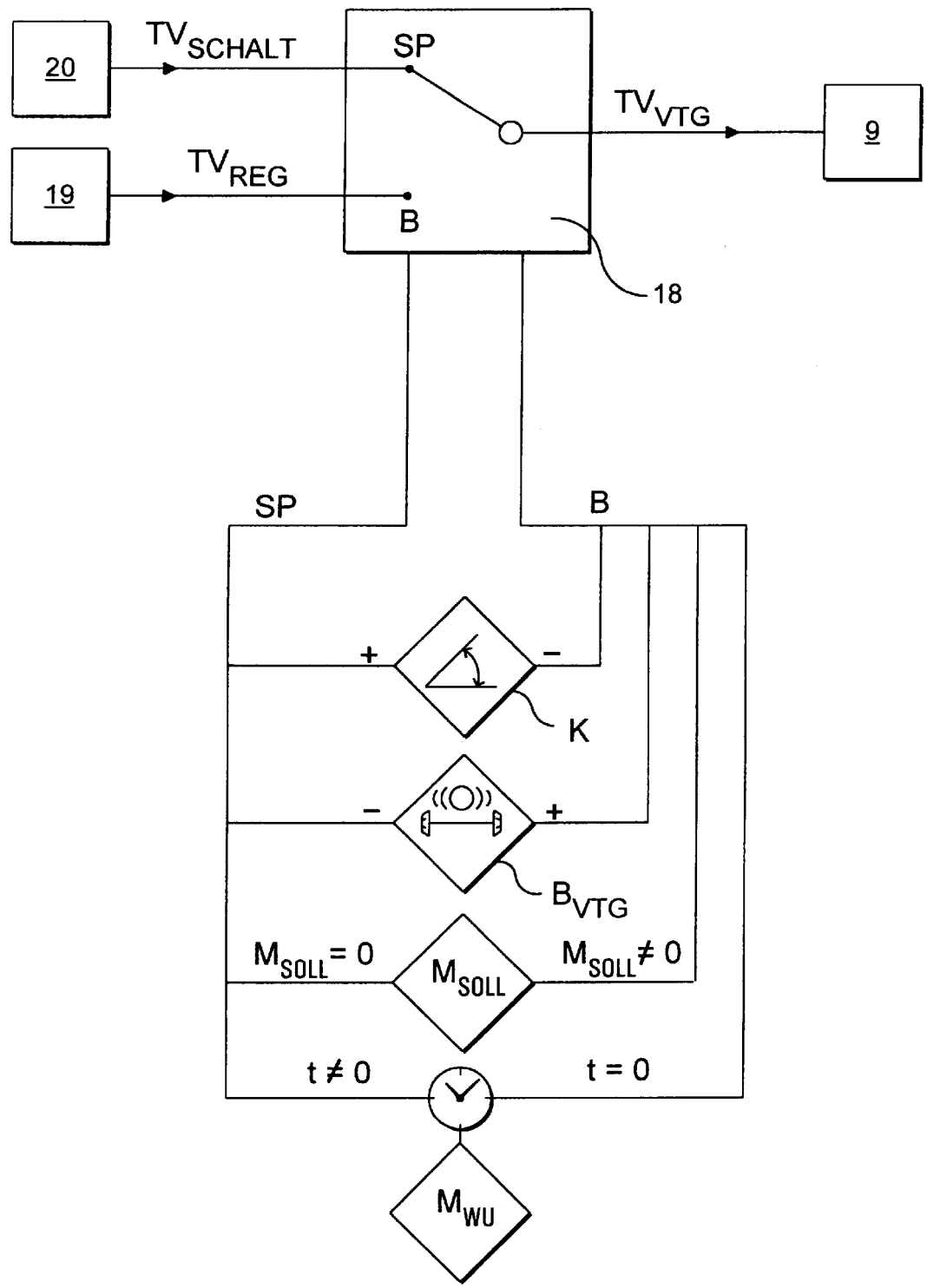
FIG. 3 shows a schematic diagram of a reversing logic of the controller of a variable turbine geometry for switching pause operation.

Control unit 10 includes a switching pause module 17 which causes turbine guide grating 8 to be brought into the switching pause position during a gear changing operation. Referring to FIG. 3, which shows a diagram of switching pause module 17, the switching pause module includes a switch 18. Switch 18 selectably switches either pulse duty factor $TV_{SCHALT}$, which is provided for the switching pause, or regulated pulse duty factor $TV_{REG}$, which is generated by control unit 19, through to actuator 9 of the variable turbine geometry.

Switching module 17 has a reversing logic which diagnoses the beginning and end of a switching pause by analyzing operating parameters, as explained in greater detail below, and by bringing switch 18 into switching pause position SP at the start of each switching pause. In switching pause position SP a signal generator 20 of switching pause pulse duty factor $TV_{SCHALT}$ is connected to actuator 9 of the turbine geometry so that signals can be transmitted. After recognizing the end of a switching pause, switching module 17 switches back to normal operating position B, in which regulated pulse duty factor $TV_{REG}$ is switched through.

In the reversing logic, at least the following information is analyzed:

a drive train clutch actuating signal K, from which it is possible to determine whether the drive train clutch has been disengaged (+)—by stepping on a clutch pedal in the vehicle to change the gear level—or whether the clutch is in the engaged operating position (−);

a parameter $B_{VTG}$ indicating whether the internal combustion engine is operating in engine braking operation (+), with support by the variable turbine geometry, or is not operating in engine braking operation (−);

setpoint torque $M_{soll}$ required by the internal combustion engine in the prevailing load state; and a predetermined switching interval for the duration of the switching pauses.

The switching time required for the switching operation can be determined in advance. The switching interval begins when a desired moment gradient $M_{wu}$, which is determined from a torque of the internal combustion engine required for acceleration of the vehicle, exceeds a predetermined gradient threshold.

The switching pause module causes the turbine grating to be brought into the switching pause position when all of the following conditions for the switching pause are met:

1) the drive train clutch of the vehicle is disengaged (K(+)).;

2) there is no engine braking operation ($B_{VTG}(-)$);

3) no setpoint torque is required by the internal combustion engine ($M_{soll}=0$); and 4) the switching time has not expired (t=0).

The switch-back from switching pause state SP to load-dependent control of the turbine guide grating takes place when the reversing logic, in analyzing the information, detects one or more of the states assigned to switch position B, and thus one or more of the following conditions are met during the switching pause:

1) the clutch pedal in the vehicle is set and the drive train clutch is engaged (K(−));

2) engine braking operation is in effect ($B_{VTG}(+)$);

3) the switching time has expired (t=0); and 4) a setpoint torque is required by the internal combustion engine ($M_{soll} \neq 0$).

What is claimed is:

1. A method of controlling a variable turbine geometry of an exhaust gas turbocharger which supercharges an internal combustion engine of a motor vehicle, the method comprising:

setting the turbine geometry as a function of an operating load of the internal combustion engine between an opening position in idling and a closed position in full load operation, a maximum flow cross section on the turbine being set at the opening position, the turbine geometry being set at an operating position predetermined for a prevailing load point; and guiding the turbine geometry into a switching pause position having a reduced turbine flow crossection during a switching pause in load operation of the internal combustion engine for changing gear levels of the motor vehicle so as to promote acceleration of the turbine out of the switching pause position, the switching pause position being independent of the operating load and being intermediate to the opening position and the closed position.

2. The method as recited in claim 1 wherein the step of guiding the turbine geometry is performed when conditions for the switching pause are met, the conditions including:

a drive train clutch of the motor vehicle being disengaged;

there being no engine braking operation being supported by the variable turbine geometry;

no setpoint torque being required by the internal combustion engine; and a desired moment gradient determined from a required torque of the internal combustion engine exceeding a predetermined gradient threshold.

3. The method as recited in claim 2 further comprising predetermining a switching time for a duration of the switching pause, the switching time beginning when the predetermined gradient threshold is exceeded by the desired moment gradient.

4. The method as recited in claim 1 further comprising returning the turbine geometry from the switching pause position to the turbine geometry set as a function of the operating load of the internal combustion engine when at least one of a plurality of return conditions is met during the switching pause, the plurality of return conditions including:

a drive train clutch of the vehicle being engaged;

an engine braking operation occurring;

a switching time elapsing; and a setpoint torque being required by the internal combustion engine.

5. The method as recited in claim 1 wherein the switching pause position is a predetermined fixed position of the turbine geometry.

6. The method as recited in claim 1 wherein the switching pause position is determined from a predetermined characteristic line as a function of a speed of the internal combustion engine when the gear levels are changing.

7. The method as recited in claim 1 further comprising:

regulating the switching pause position at a predetermined guide quantity; and determining a pressure gradient between an intake system and an exhaust system of the internal combustion engine as a control quantity.

* * * * *

UNITED STATES PATENT AND TRADEMARK OFFICE
CERTIFICATE OF CORRECTION

PATENT NO.    : 6,089,018
DATED         : July 18, 2000
INVENTOR(S)   : Bischoff et al.

It is certified that error appears in the above-identified patent and that said Letters Patent is hereby corrected as shown below:

Column 3,
Line 12, change "… vehicle Internal …" to -- vehicle. Internal --.

Signed and Sealed this

Sixteenth Day of October, 2001

Attest:

NICHOLAS P. GODICI
*Attesting Officer*    *Acting Director of the United States Patent and Trademark Office*